US011941412B1

(12) United States Patent
Shanmugam et al.

(10) Patent No.: US 11,941,412 B1
(45) Date of Patent: Mar. 26, 2024

(54) COMPUTER SOFTWARE PROGRAM MODULARIZATION AND PERSONALIZATION

(71) Applicant: INTUIT INC., Mountain View, CA (US)

(72) Inventors: Elangovan Shanmugam, Cupertino, CA (US); Gaurav Chaubal, Sunnyvale, CA (US); Christopher D. Draycott, Morgan Hill, CA (US)

(73) Assignee: INTUIT INC., Mountain View, CA (US)

( * ) Notice: Subject to any disclaimer, the term of this patent is extended or adjusted under 35 U.S.C. 154(b) by 503 days.

(21) Appl. No.: 15/849,528

(22) Filed: Dec. 20, 2017

(51) Int. Cl.
*G06F 15/00* (2006.01)
*G06F 8/54* (2018.01)
*G06F 9/445* (2018.01)
*G06F 21/00* (2013.01)
*H04N 5/225* (2006.01)

(52) U.S. Cl.
CPC .............. *G06F 9/4451* (2013.01); *G06F 8/54* (2013.01)

(58) Field of Classification Search
CPC .................................................... G06F 9/4451
See application file for complete search history.

(56) References Cited

U.S. PATENT DOCUMENTS

| 8,191,002 | B2* | 5/2012 | Lauridsen | G06F 3/0484 715/760 |
| 8,447,760 | B1* | 5/2013 | Tong | G06F 16/24578 707/728 |
| 8,448,136 | B2* | 5/2013 | Mills | G06F 8/34 717/107 |
| 8,972,962 | B2* | 3/2015 | Becker | G06F 9/547 717/140 |
| 9,094,414 | B2* | 7/2015 | Immonen | H04L 63/102 |
| 9,948,966 | B1* | 4/2018 | Panchaksharaiah | H04N 21/26258 |
| 2002/0152242 | A1* | 10/2002 | Meyer | G06F 11/3495 715/255 |
| 2005/0278323 | A1* | 12/2005 | Horvitz | G06F 16/954 |
| 2008/0294639 | A1* | 11/2008 | Davis | G06Q 10/10 |
| 2011/0276918 | A1* | 11/2011 | Bennett | G06F 9/453 715/808 |
| 2012/0069131 | A1* | 3/2012 | Abelow | G06Q 10/067 348/14.01 |

(Continued)

*Primary Examiner* — S. Sough
*Assistant Examiner* — Mohammad H Kabir
(74) *Attorney, Agent, or Firm* — DLA PIPER LLP (US)

(57) ABSTRACT

A method of customizing a personal software program for a user, comprising collecting attributes of each of a plurality of users registered to access the personal software program, generating a plurality of user profiles based on the collected attributes of the users, monitoring the interactions or non-interactions of the users with a module of the personal software program, deriving a reference user profile from the plurality of user profiles, linking the module with the reference user profile based on the monitored interactions or non-interactions of the users with the module, acquiring attributes of the user, generating a user profile based on the acquired attributes of the user, comparing the user profile to the reference user profile, determining a match between the user profile and the reference user profile based on the comparison, and setting the availability of the module to the user.

36 Claims, 8 Drawing Sheets

(56) References Cited

U.S. PATENT DOCUMENTS

| | | | |
|---|---|---|---|
| 2013/0097695 A1* | 4/2013 | Sipe | G06F 9/4451 |
| | | | 726/17 |
| 2016/0088352 A1* | 3/2016 | Agarwal | H04N 21/4667 |
| | | | 725/12 |
| 2016/0255139 A1* | 9/2016 | Rathod | H04L 67/10 |
| | | | 709/203 |
| 2017/0060395 A1* | 3/2017 | Kemmer | G06F 3/04847 |
| 2018/0040062 A1* | 2/2018 | Dintenfass | G06Q 40/02 |
| 2018/0063580 A1* | 3/2018 | Wittke | H04N 21/4335 |
| 2018/0095626 A1* | 4/2018 | Hardee | G06F 8/61 |
| 2018/0102992 A1* | 4/2018 | Pysanets | H04L 51/046 |

\* cited by examiner

Fig. 4

| USER PROFILE 1 | |
|---|---|
| AGE | 24 |
| GENDER | MALE |
| OCCUPATION | ATTORNEY |
| RESIDENCE | NEW YORK CITY |
| MARITAL STATUS | SINGLE |
| DEPENDENTS | 0 |
| ETHNICITY | CAUCASIAN |
| EDUCATION LEVEL | POST GRADUATE |
| INCOME LEVEL | 100K-150K |

| USER PROFILE 2 | |
|---|---|
| AGE | 36 |
| GENDER | FEMALE |
| OCCUPATION | ATTORNEY |
| RESIDENCE | LOS ANGELES |
| MARITAL STATUS | MARRIED |
| DEPENDENTS | 2 |
| ETHNICITY | LATINO |
| EDUCATION LEVEL | GRADUATE |
| INCOME LEVEL | 75K-100K |

⋮

| USER PROFILE n | |
|---|---|
| AGE | 40 |
| GENDER | MALE |
| OCCUPATION | PLUMBER |
| RESIDENCE | TULSA |
| MARITAL STATUS | MARRIED |
| DEPENDENTS | 1 |
| ETHNICITY | CAUCASIAN |
| EDUCATION LEVEL | HIGH SCHOOL GRADUATE |
| INCOME LEVEL | 50K-75K |

Fig. 5

| REFERENCE USER PROFILE 1 ||
|---|---|
| AGE RANGE | 25-30 |
| GENDER | MALE |
| MARITAL STATUS | SINGLE |
| MODULES | 1, 3 |

| REFERENCE USER PROFILE 2 ||
|---|---|
| AGE | 31-35 |
| GENDER | FEMALE |
| EDUCATION LEVEL | UNDERGRADUATE OR ABOVE |
| MODULES | 1 |

| REFERENCE USER PROFILE 3 ||
|---|---|
| AGE RANGE | 60-100 |
| OCCUPATION | RETIRED |
| MODULES | 4 |

| REFERENCE USER PROFILE 4 ||
|---|---|
| INCOME LEVEL | 200K-300K |
| MODULES | 7 |

| REFERENCE USER PROFILE 5 ||
|---|---|
| AGE RANGE | 30-40 |
| INCOME LEVEL | 100K-150K |
| RESIDENCE | NEW YORK |
| MODULES | 5 |

•
•
•

| REFERENCE PROFILE m ||
|---|---|
| AGE RANGE | 50-60 |
| DEPENDENTS | 0 |
| INCOME LEVEL | 50k-250k |
| MODULES | 2, 4, 7 |

COMPUTER SOFTWARE PROGRAM MODULARIZATION AND PERSONALIZATION

FIELD OF INVENTION

Embodiments relate to software application configurations, and more particularly, to automatic customization of computer software applications for respective end users.

BACKGROUND

Computer software programs or applications are often configured as "one size fits all" in an attempt to apply to a wide range of users with different needs, experience, knowledge and expectations. However, while computer software applications are often structured to be static and comprehensive applications that cover a large variety of use cases, the result of such comprehensive capabilities is that end users are often presented with various capabilities or functions that are not necessary, confusing, and beyond a user's skill or experience level. Further, it is often the case that end users do not even utilize most of the functions or capabilities of a software application. The foregoing issues can be exacerbated in software applications that are structured with an increasing number of features (perhaps 100's of features or variations of features) that can be added over time. Executing software applications with unused features also wastes computing resources (processor, memory, data storage) and increases communication or network resources as a result of having too many features executed. Furthermore, the presence of unused features in software programs may potentially expose users to security vulnerabilities that could arise in unused (but still installed, and possibly executed) software modules.

Thus, a challenge exists as to how to package or compose computer software applications for different end users.

SUMMARY

A computerized system for customizing a modularized software program (e.g., a personal finance program), a method of customizing a modularized software program (e.g., a personal finance program) for a user, and a computer program product comprising a non-transistory computer readable storage medium having stored thereupon a sequence of instructions which, when executed by a computer, causes the computer to perform a method for customizing a modularized software program (e.g., a personal finance program) for a user are provided.

The method comprises collecting attributes of each of a plurality of users registered to access the software program (e.g., one or more of an age, gender, occupation, geographical residence, marital status, number of dependents, ethnicity, education level, and income level), and generating a plurality of user profiles based on the collected attributes of the users. The method further comprises monitoring the interactions or non-interactions of the users with a module (e.g., a finance management module) of the software program. In one embodiment, monitoring the interactions or non-interactions of the users with the module comprises monitoring a number of times or frequency of the interactions with the module. In another embodiment, monitoring the interactions or non-interactions of the users with the module comprises monitoring a date range (e.g., from present day to a period of time prior to the present day) of the interactions with the module. In still another embodiment, monitoring the interactions or non-interactions of the users with the module comprises monitoring a time of the year.

The method further comprises deriving a reference user profile from the plurality of user profiles, and linking the module with the reference user profile based on the monitored interactions or non-interactions of the users with the module. In one embodiment, linking the module with the reference user profile comprises determining a percentage of the users that interact with the module, comparing the interaction percentage to a threshold percentage, and linking the module to the reference user profile based on the comparison between the interaction percentage and the threshold percentage. For examples, the module may be linked to the reference user profile if the interaction percentage is greater than the threshold percentage, or may be linked to the reference user profile if the interaction percentage is less than the threshold percentage. In another embodiment, linking the module with the reference user profile comprises determining a number of times or frequency that each user interacts with the module, and comparing the number of times or frequency to a threshold number, and linking the module to the reference user profile based on the comparison between the number of times or frequency and the threshold number.

The method further comprises acquiring attributes of the user, generating a user profile based on the acquired attributes of the user, comparing the user profile to the reference user profile, determining a match between the user profile and the reference user profile based on the comparison, and setting the availability of the module to the user. In one embodiment, setting the availability of the module to the user comprises making the module available to the user. For example, making the module available to the user comprises automatically activating the module in a software program available to the user, or making the module available to the user comprises providing the user an option to activate the module in a software program available to the user. In another embodiment, setting the availability of the module to the user comprises making the module unavailable to the user. For example, making the module unavailable to the user comprises automatically deactivating the module in a software program available to the user.

In an optional embodiment, the method further comprise monitoring the interactions or non-interactions of the users with another module of the software program, deriving another reference user profile from the plurality of user profiles, linking the other module with the other reference user profile based on the monitored interactions or non-interactions of the users with the other module, and comparing the user profile to the other reference user profile. The module and the other module may be different from each other, or the module and the other module may be the same as each other.

In another optional embodiment, the method further comprises monitoring the interactions or non-interactions of the users with another module of the software program, linking the other module with the reference user profile based on the monitored interactions or non-interactions of the users with the other module, and setting the availability of the other module to the user.

In still another embodiment, the method further monitoring life events of the users, and updating the user profiles based on the monitored life events. In this case, the match determination and module availability steps may be triggered by a monitored life event of the user.

Other and further aspects and features of the disclosed embodiments will be evident from reading the following detailed description of the embodiments, which are intended to illustrate, not limit, the invention.

BRIEF DESCRIPTION OF THE DRAWINGS

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which:

FIG. 4 is a table containing exemplary user profiles generated by the product offering program of FIG. 3;

FIG. 5 is a look-up table containing exemplary reference user profiles and linked software application modules that can be generated by the product offering program of FIG. 3;

DETAILED DESCRIPTION OF ILLUSTRATED EMBODIMENTS

The computerized system described herein is capable of customizing a modularized computer program for a user by monitoring the interaction of users with various modules of the computer program to determine the types of users that are most likely to use a particular module of the computer program, comparing the profile of the user to the profiles of these types of users to determine a match, and making the particular module available to the user if there is a match. The computerized system described herein is also capable of customizing a modularized computer program for a user by monitoring the non-interaction of users with various modules of the computer program to determine the types of users that are least likely to use a particular module of the computer program, comparing the profile of the user to the profiles of these types of users to determine a match, and making the particular module unavailable to the user if there is a match.

In either event, the computerized system provides the user access to only the modules of the computer program that the user is most likely to use, and thus, solves the computer-centric or Internet-centric problem that exists for previous computerized systems that provide all-in-one modularized computer programs with no ability to customize the computer program, graduate from one computer software feature to another, or to upsell or promote newer more relevant computer software features. It should also be appreciated that the computerized system also improves the efficiency of computer systems on which the modularized computer program executes by selectively deactivating certain modules that are not used by the user of the computer program, thereby reducing use of computing resources (processor, memory, data store) and reducing communication or network resources as a result of having only certain features executed.

Although the computerized system is described herein in the context of personal finance management, it should be appreciated that this is only one example, and the computerized system can be used in any context where it is desirable to customize a modularized computer program for a particular user.

Figure 1:
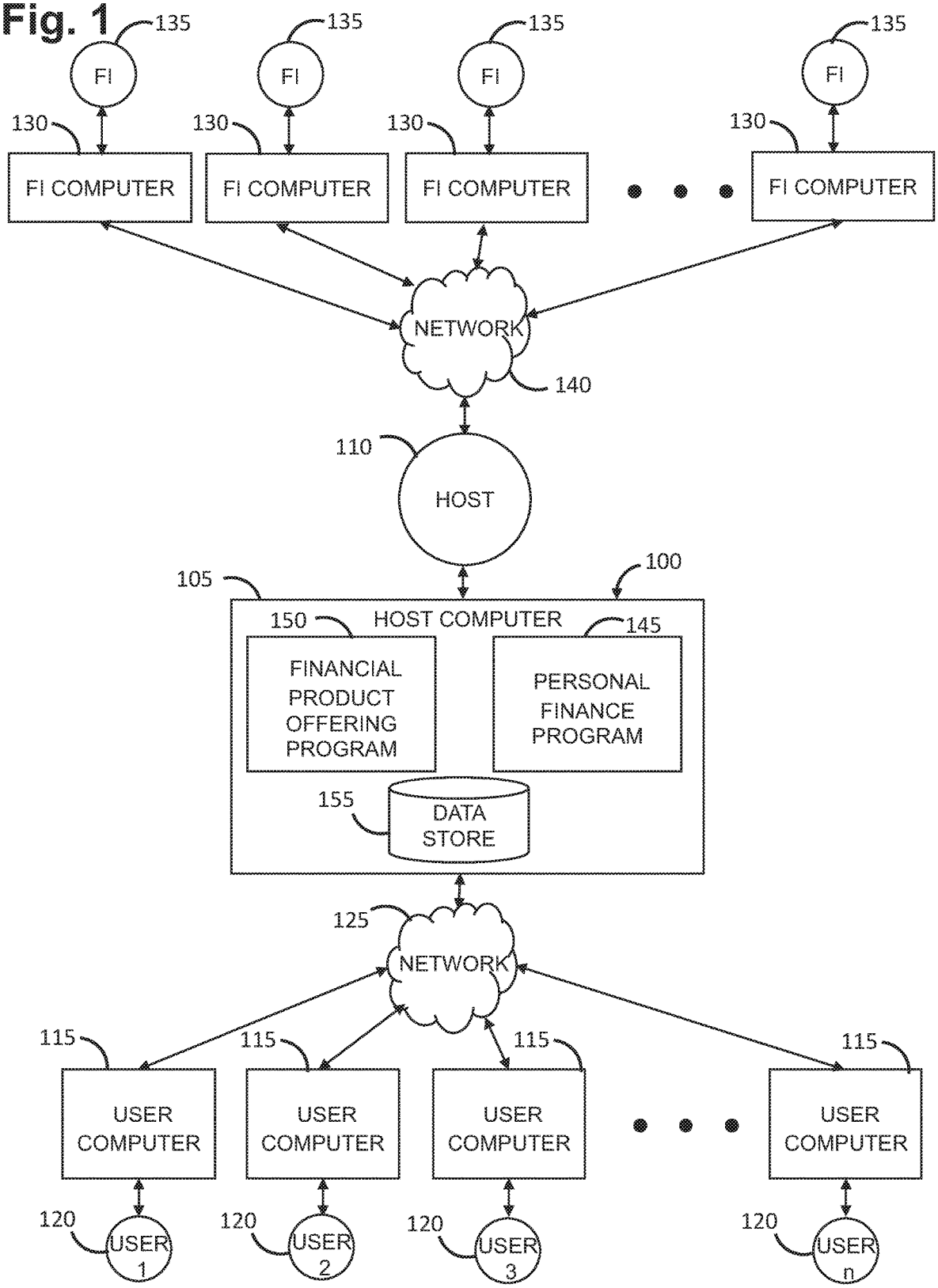
FIG. 1 is a block diagram of software application offering system constructed according to one embodiment of the present inventions.

Referring to FIG. 1, a computerized software product offering system 100 (and in this specific case, a financial product offering system) arranged in accordance with one embodiment of the present invention will be described. The system 100 is configured for automatically customizing a software program 145 (and in this specific case, a personal finance program) for a user. The system 100 may accomplish this by monitoring the interactions and/or non-interactions of existing users with the various features of the personal finance program, and customizing an offering of the personal finance program to the user based on such user interactions or non-interactions with the personal finance program.

The financial product offering system 100 comprises one or more host computers 105 (only one shown) managed by a host 110 (e.g., Intuit Inc.) that is capable of interacting with a plurality of user computers 115 associated with a plurality of registered users 120 (users 1-n) via one or more networks 125. The host 110 may be a financial institution (FI) that hosts financial accounts of the users 120 or a financial services or financial management company, such as Intuit Inc., which provides or hosts a personal finance program. In the illustrated embodiment, the host 110 is in communication with respective computers 130 of respective financial institutions (FIs) 135 through one or more networks 140.

The FIs 135 may manage consumer accounts of the registered users 120. Such consumer accounts may be, e.g., checking, savings, money market, credit card or other accounts utilized for purchases of items (goods or services) from merchants, and the FI 135 may be a bank, a credit union, credit card issuer, or other FI. Account data reflecting the transactions may include, for example, account balances, transactions (e.g., deposits, withdraws, and bill payments), debits, credit card transactions (e.g., for merchant purchases). An FI 135 may also comprise a credit reporting company, such as TransUnion® or Experian®, which collects credit account information about a user's borrowing and repayment history, including the original amounts of loans, credit limits on credit cards, balances on credit cards or other loans, payment status of accounts, including whether loans have been repaid on time, items sent for collection, public records, such as judgments and bankruptcies, etc. Credit reporting companies may gather information from many sources, including nationwide lenders, public records, such as bankruptcies, garnishments, liens, and other judgments, and collections agencies, which provide information on delinquent accounts.

Each of the computers 115 may be a laptop or desktop computer or tablet computing device, such as those available from Apple, Inc., or a mobile communication device such as a smartphone or PDA or other mobile computing device having mobile communication capabilities. The networks 125, 140 may be, for example, a wireless or cellular network, Local Area Network (LAN), a Wide Area Network (WAN), Metropolitan Area Network (MAN), other suitable networks capable of transmitting data, and a combination of such networks. For ease of explanation, reference is made to a network generally, but various networks, combinations of networks and communication systems, methods and protocols may be utilized depending on the system components employed, and it is not intended to refer to a specific network or communications protocol.

The financial product offering system 100 comprises the aforementioned personal finance program 145, a software product offering program 150 (and in this specific case, a financial product offering program) that is configured to customize and offer access of the personal finance program 145 to various ones of the users 120, as well as a data store 155 configured for storing data associated with the customization of the personal finance program 145.

The personal finance program 145 either executes on or is otherwise accessible by the user computers 115. In the illustrated embodiment, personal finance program 145 is an on-line personal finance program that resides and executes on a computer separate from the user computer 120 (such as the host computer 105) that can be accessed and utilized by user 120 through the network 125 by executing a browser on the user computer 115. In alternative embodiments, the personal finance program 145 is executable on the user computers 115. In this case, the user computer 120 comprises a memory (not shown) for storing the personal finance program 145 and associated data. Thus, the personal finance program 145 may be implemented using both desktop and on-line versions thereof.

The personal finance program 145 is executed to assist the registered user 120 with managing their finances and that is used solely for financial management. In its most general terms, the personal finance program 145 is defined to include any personal finance program that gathers electronic transaction data, has the capability to receive or retrieve electronic transaction data, analyze and categorize at least part of the electronic transaction data into various reports or displays that are provided to a user, and provides the user with the capability to conduct, and/or monitor, financial transactions. For ease of explanation, reference is made generally to a single personal finance program 145, but embodiments may involve multiple personal finance programs 145. Examples of personal finance programs 145 include, but are not limited to: QUICKBOOKS®, QUICKBOOKS On-Line®, FINANCEWORKS®, PayCycle®, Mint.com™ and Intuit Payroll Services®, all of which are available from Intuit Inc. of Mountain View, California; and various other financial management systems.

Figure 2:
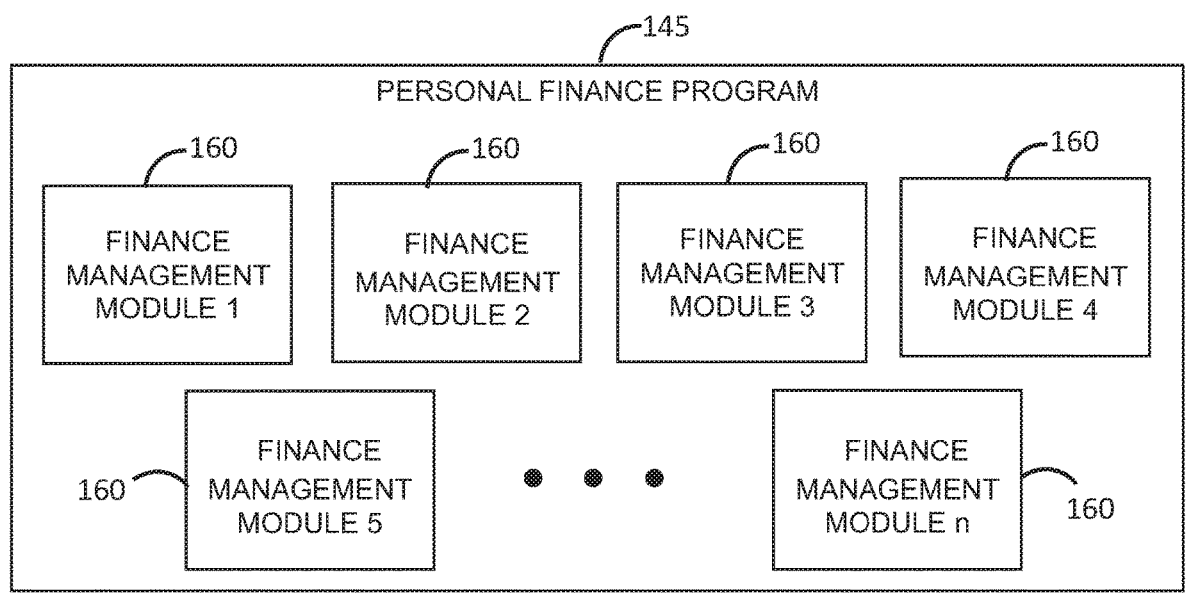
FIG. 2 is a block diagram of an exemplary modularized software application that can be customized by the system of FIG. 1.

In the illustrated embodiment shown in FIG. 2, the personal finance program 145 is modularized in that any one of a variety of software modules 160 (modules 1-n) (and in this specific case, finance management modules) may be selectively activated or deactivated by the host 110. Such finance management modules 160 may include, but are not limited to, credit score monitoring, financial transactions management, various types of budgeting, bill pay, income tracking, tax filing and reporting, tax estimation, goal setting, asset management, investments, time tracking, mile tracking, ways to save, ways to give, ways to spend, etc.

Thus, different finance management modules 160 of the personal finance program 145 may be available to different users 120, which as will be described in further detail below, will depend upon the profiles of the users 120.

Figure 3:
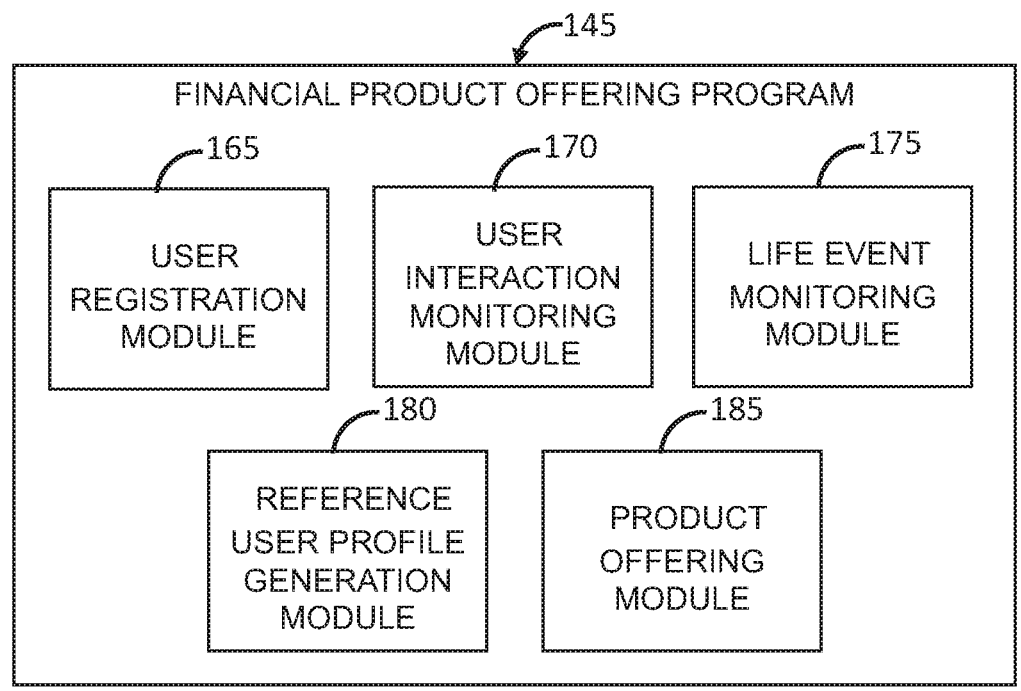
FIG. 3 is a block diagram of a product offering program of the software application offering system of FIG. 1.

Referring to FIG. 3, the financial product offering program 145 comprises a user registration module 165, a user interaction monitoring module 170, a life event monitoring module 175, a reference user profile generation module 180, and a product offering module 185. In the illustrated embodiment, the financial product offering program 145 is stand-alone program in communication with the personal finance program 145; however, in the case where the personal finance program 145 executes on the host computer 105, the personal finance program 145 may form a part of the financial product offering program 145. The modules of the financial product offering program 145 may execute on a single host computer 105 or may execute on multiple host computers 105.

The registered user module 165 is configured for managing the registration process of each of the users 120 with respect to the personal finance program 145, resulting in the generation of a user profile 190 for each user 120 registered with the personal finance program 145. As illustrated in FIG. 4, exemplary user profiles 190 may comprise attributes of the respective users 120 (users 1-n), such as, e.g., age, gender, occupation, geographical residence, marital status, number of dependents, ethnicity, education level, and income level. The information used to generate each user profile 190 may be accumulated via manual entry by the respective user 120 of such information in response to a query during the registration process and/or may be accumulated from other sources, such as from the FIs 135 or from other programs or products of the host 110 with which the user 120 has previously registered.

The user interaction module 165 is configured for monitoring the interactions and non-interactions of the users 120 with the finance management modules 160 of the personal finance program 145, and storing this interaction/non-interaction data in the data store 155. For example, the user interaction module 165 may monitor the number of times a particular user 120 interacts with a finance management module 160 of the personal finance program 145, including not interacting with the finance management module 160 at all, and the frequency that the user 120 interacts with the finance management module 160. The user interaction module 165 may monitor the interaction/non-interaction of the particular user 120 with a finance management module 160 within a particular date range (e.g., the last three months) or may monitor the interaction/non-interaction of the particular user 120 with a finance management module 160 in an absolute sense (e.g., since registration of the user 120 with the personal finance program 145).

The life event monitoring module 175 is configured for monitoring information that is indicative of life events of the users 120. A life event can be defined as a significant or major event in a user's life that changes the user's status or circumstances. In other words, a life event is a demarcated change or a turning point in the user's demographic, education, employment, health, or other circumstances locatable to a particular point in time. Examples of life events include, but are not limited to, giving birth, adoption, marriage, divorce, death of a spouse or family member, a new job, unemployment or loss of a job, moving to a new location such as a new city, state, or country, a major illness and physical incapacity. The information that is monitored by the life event monitoring module 175 may come directly from the user 120 as a manual entry or may come from monitoring electronic transaction data retrieved from one or more electronic sources, e.g., electronic transaction data generated by purchases of goods and services by the user 120 from merchants (not shown). The life event information can be utilized by the registered user module 165 to update user profiles 190 of previously registered users 120 stored in the data store 155.

The reference user profile generation module 170 is configured for generating a plurality of reference user profiles 195 (shown in FIG. 5) and respectively linking finance management modules 160 to the reference user profiles 195 based on the monitoring of the user interactions/non-interactions with the finance management modules 160 of the personal finance program 145.

In particular, the reference user profile generation module 170 generates reference user profiles 195 that define the types of users 120 that are more apt to use the finance management modules 160 that are linked to the respective user profiles 165, in which case, access to these finance management modules 160 may be provided to users 120 with similar user profiles 165, as will be discussed in further detail below. Or, the reference user profile generation module 170 generates reference user profiles 195 that define the types of users 120 that are less apt to use the finance management modules 160 that are linked to the respective user profiles 165, in which case, access to these finance management modules 160 may be denied to users 120 with similar user profiles 165, as will be discussed in further detail below.

The reference user profile generation module 170 generates these reference user profiles 195 and links finance management modules 160 by analyzing the interaction/non-interaction data monitored by the user interaction module 165 to correlate the attributes of the users 120 (acquired from their user profiles 190) to finance management modules 160 of the personal finance program 145. For example, it may be determined that users 120 having a particular set of attributes are more likely to use a particular finance management module 160, or that users 120 having another particular set of attributes are less likely to use another finance management module 160. Using these correlations, the reference user profile generation module 170 generates reference user profiles 195 and links finance management modules 160 with them.

Thus, a finance management module 160 linked to a particular reference user profile 195 may be indicative of a finance management module 160 most likely to be used by a user 120 having the same attributes in this reference user profile 195 or may be indicative of a finance management module 160 least likely to be used by a user 120 having the same attributes in this reference user profile 195.

In one embodiment, the reference user profile generation module 170 determines a percentage of the users 120 that interact with a particular finance management module 160, compares this interaction percentage with a threshold percentage, and includes this particular finance management module 160 within the set of finance management modules 160 linked to the reference user profile 195 based on the comparison between the interaction percentage and the threshold percentage.

For example, if a relatively high percentage of users 120 interact with a particular financial management 160, this eventuality naturally indicates that this finance management module 160 is one that users 120 are most likely to interact with in the future. In this case, if the finance management module 160 is deemed to be most likely used by a user 120 having the same attributes in this reference user profile 195, the particular finance management module 160 will be linked to the reference user profile 195 if the interaction percentage is greater than the threshold percentage.

In contrast, if a relatively low percentage of users 120 interact with a particular finance management module 160, this eventuality naturally indicates that this finance management module 160 is one that users 120 are least likely to interact with in the future. In this case, if the finance management module 160 is deemed to be least likely used by a user 120 having the same attributes in this reference user profile 195, the particular finance management module 160 will be linked to the reference user profile 195 if the interaction percentage is less than the threshold percentage.

In another embodiment, the reference user profile generation module 170 determines a number of times or frequency that each user 120 interacts with a particular finance management module 160, and weights the respective user 120 in the percentage interaction determination based on the number of times or frequency that each user 120 interacts with a particular finance management module 160.

For example, if the number of times or frequency that a particular user 120 interacts with a particular finance management module 160 is relatively high, this eventuality naturally indicates that the interaction of this particular user 120 with the particular finance management module 160 is significant enough to be included within the numerator of the interaction percentage determination in the case where the finance management module 160 is deemed to be most likely used by a user 120 having the same attributes in this reference user profile 195.

In contrast, if the number of times or frequency that a particular user 120 interacts with a particular finance management module 160 is relatively low, this eventuality naturally indicates that the interaction of this particular user 120 with the particular finance management module 160 is significant enough to be included within the numerator of the interaction percentage determination in the case where the finance management module 160 is deemed to be least likely used by a user 120 having the same attributes in this reference user profile 195.

In still another embodiment, the reference user profile generation module 170 monitors the time of year that each user 120 interacts with a particular finance management module 160. For example, if a particular user 120 interacts with a particular management module 160 during a particular time of year (e.g., summer) significantly more than at other times of the years, this eventuality naturally indicates that the interaction of this particular user 120 with the particular finance management module 160 is only significant during that time of year, and therefore, the reference user profile 195 may be marked at being usable during this time of year.

As illustrated in FIG. 5, various exemplary reference user profiles 195 are illustrated with exemplary linked finance management modules 160. As there shown, reference user profile 1 consists of the user attributes: age range, gender, marital status, and is linked with finance management modules 1 and 3; reference user profile 2 consists of the user attributes: age, gender, and education level, and is linked with finance management module 1; reference user profile 3 consists of the user attributes: age and occupation, and is linked with finance management module 4; reference user profile 4 consists of the user attribute: income level, and is linked with finance management module 7; reference user profile 5 consists of the user attributes age range, income level, and residence, and is linked with finance management module 5; and reference user profile m consists of the user attributes: age range, dependents, and income level, and is linked with finance management modules 2, 4, and 7.

As there shown, each of the reference user profiles 195 comprises only a subset of attributes of a full user profile 190, since a reference user profile 195 will only include attributes that are relevant to a finance management module 160 witch which it is linked. It should also be appreciated that multiple finance management modules 160 may be linked to a particular reference user profile (e.g., modules 1 and 3 linked with reference user profile 1, and modules 2, 4, and 7 linked with reference user profile m). It should also be appreciated that a single finance management module 160 may be linked with multiple reference user profiles 195. For example, finance management module 1 is linked with reference user profiles 1 and 2; finance management module 4 is linked with reference user profiles 3 and m; and finance management module 7 is linked with reference user profiles 4 and 7.

Referring back to FIG. 3, the product offering module 185 is configured for setting the availability of the finance management modules 160 to a particular user 120 based on a comparison between the user profile 190 of the user 120 and the reference user profiles 195. In one embodiment, the product offering module 185 is configured for comparing this user profile 190 with the reference user profiles 195 to determine a match or matches between the user profile 190 and any of the reference user profiles 195, and making the finance management module(s) 160 linked to the matching reference user profile(s) 195 available or unavailable to the user 120.

For example, if the attributes in a user profile 190 match the attributes in a particular reference user profile 195 that is linked to finance management modules 160 that are likely to be utilized by a user 120 having the same attributes in that reference user profile 195, then the product offering module 185 may make these finance management modules 160 in the personal finance program 145 available to the user 120. In contrast, if the attributes in a user profile 190 match the attributes in a particular reference user profile 195 that is linked to a set of finance management modules 160 that are less likely to be utilized by a user 120 having the same attributes in that reference user profile 195, then the product offering module 185 may make these finance management modules 160 in the personal finance program 145 unavailable to the user 120.

As examples, a match between a user profile 190 and reference user profile 1 may occur if the user profile 190 corresponds to a 27-year old, single, male; a match between a user profile 190 and reference user profile 2 may occur if the user profile 190 corresponds to a 31-year old female with a post-graduate degree; a match between a user profile 190 and reference user profile 3 may occur if the user profile 190 corresponds to a 75-year old retiree; a match between a user profile 190 and reference user profile 4 may occur if the user profile 190 corresponds to a person making $250K a year; a match between a user profile 190 and reference user profile 5 may occur if the user profile 190 corresponds to a 38-year old person, making $125K a year, and residing in New York City; and a match between a user profile 190 and reference user profile m may occur if the user profile 190 corresponds to a 55-year old person, having 0 dependents, and making $60K a year.

In the optional embodiment, where a reference user profile 195 is marked with a time of year, the product offering module 185 may only compare the user profile 190 to the reference user profile 195 if it is currently that time of year. For example, if the reference user profile 195 is marked as only to be used during Summer, the product offering module 185 may only, during Summer, compare the attributes of the user profile 190 with the attributes of the reference user profile 195 to determine whether a finance management module 160 linked to the reference user profile 195 should be made available to the user 120.

The product offering module 185 may make a finance management module 160 available or unavailable to the user 120 in a variety of manners. For example, in one embodiment, the product offering module 185 may make a finance management module 160 available to a user 120 by automatically activating the finance management module 160 in a personal finance program accessible to the user 120, and make a finance management module 160 unavailable to a user 120 by automatically deactivating the finance management module 160 in a personal finance program accessible to the user 120.

In an optional or alternative embodiment, instead of automatically activating or deactivating finance management modules 160 of the personal finance program 145 that is accessible by the user 120, the product offering module 185 may send a query to the user 120 providing an option to activate or deactivate the management modules 160. In the illustrated embodiment, the product offering module 185 makes the finance management modules 160 available or unavailable to the user 120 during the registration process of the user 120, although in alternative embodiments, the product offering module 185 may make the finance management modules 160 available or unavailable to the user 120 any time after the registration process. For example, as discussed above, the life event information monitored by the life event monitoring module 175 may be used to update the user profile 190 of a user 120 that has experienced the life event, which may trigger the product offering module 185 to compare the updated user profile 190 to the reference user profiles 195 to find one or more matching reference user profiles 195 and then offering the finance management modules 160 of the personal finance program 145 linked to these matching reference user profile(s) 165 to the user 120 via automated or queried deactivation/activation of the finance management modules 160.

For the purposes of this specification, "activation" or "deactivation" means allowing access or blocking access of a module 160 to a user 120, and will be accomplished depending upon the manner in which the users 120 access the personal finance program 145. For example, in one embodiment where each user 120 accesses the personal finance program 145 remotely online, an instance of the personal finance program 145 containing only those modules 160 that are "active" may be executed on the host computer 105 for each user 120 and remotely accessed by that user 120. In another embodiment, an instance of the personal program 145 containing all modules 160 may be executed on the host computer 105 for each user 120, but access to the deactivated modules 160 of the executed instance of the personal finance program 145 is blocked by the product offering module 185. In another embodiment, the host computer 105 merely filters deactivated modules 160 out as being irrelevant for the user in question. In another embodiment where each user 120 has a personal finance program 145 that executes locally on the respective user computer 115, only a personal finance program 145 that contains the activated modules 160 is downloaded to that user computer 115. In another embodiment, each user 120 will be allowed to manually activate or deactivate a module 160 from a list of modules 160.

Figure 6:
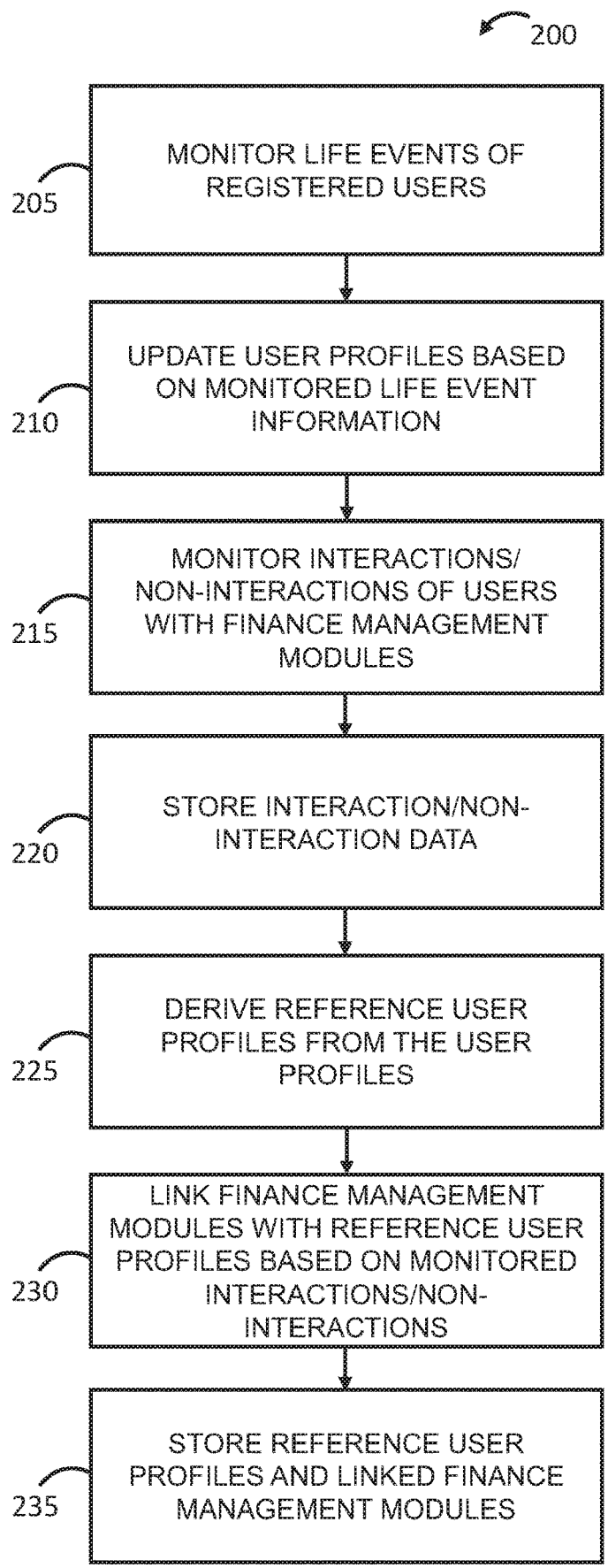
FIG. 6 is a flow diagram illustrating one method performed by the product offering program of FIG. 3 for generating reference user profiles and linked software application modules.

Having described the functioning of the financial product offering system 100 with reference to FIG. 6, one method 200 performed by the financial product offering system 100 to generate reference user profiles 195 and linked finance management modules 160 of the personal finance program 145 will now be described. It is assumed at the beginning of the method 200 that there are many registered users 120 of the personal finance program 145, and that a corresponding number of user profiles 190 have been generated and stored in the data store 155.

First, the life event monitoring module 175 monitors information that is indicative of life events of all of the registered users 120 (step 205), and the registered user module 165 updates the user profiles 190 stored in the data store 155 based on the monitored life event information (step 210). Next, the user interaction module 165 monitors the interactions and non-interactions of various registered users 120 with the finance management modules 160 of the personal finance program 145 (step 215), and stores this interaction/non-interaction data in the data store 155 (step 220). As discussed above, the user interaction module 165 may monitor the number of times or frequency that the users 120 interact a finance management module 160 of the personal finance program 145 within a particular date range or in an absolute sense.

Next, the reference user profile generation module 170 derives reference user profiles 195 from the user profiles 190 (step 225), respectively links finance management modules 160 to the reference user profiles 195 based on the monitored interactions/non-interactions of the users 120 with the finance management modules 160 of the personal finance program 145 (step 230), and stores the reference user profiles 195 and linked finance management modules 160 in the data store 155 (step 235). As discussed above, the reference user profile generation module 170 may perform this function by analyzing the interaction/non-interaction data monitored by the user interaction module 165 to correlate the attributes of the users 120 (acquired from their user profiles 190) to finance management modules 160 of the personal finance program 145, and based on this information, generating reference user profiles 195 that define the types of users 120 that are most likely to use or less likely to use the finance management modules 160 that are linked to the respective user profiles 165. It should be noted that even though the steps 205-235 are illustrated as occurring in a particular order, it should be appreciated that these steps 205-235 can, in reality, concurrently be performed or be performed in an entirely different order.

Figure 7:
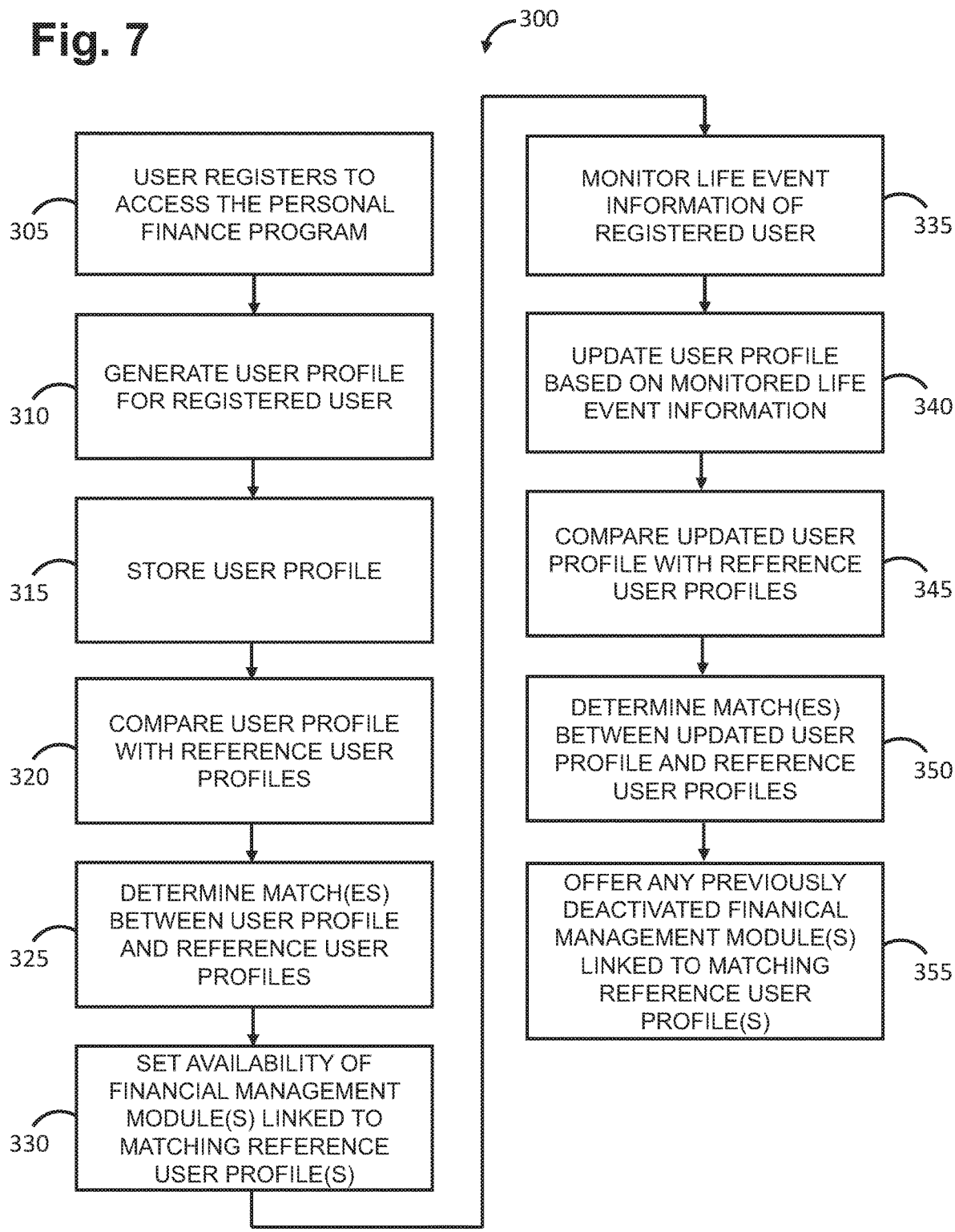
FIG. 7 is a flow diagram illustrating one method performed by the product offering program of FIG. 3 for customizing a modularized personal finance program for a user.

Referring now to FIG. 7, one method 300 of making a customized offering of the personal finance program 145 to a user 120 will now be described. First, the user 120 registers with the host 110 to access the personal finance program 145 (step 305). Through this registration process and/or through other means, the registered user module 165 generates a user profile 190 for the user 120 (step 310), and stores the user profile 190 in the data store 155 (step 315). The product offering module 185 compares this user profile 190 with the reference user profiles 195 (step 320), and determines a match or matches between the user profile 190 and any of the reference user profiles 195 (step 325). The product offering module 185 then customizes the personal finance program 145 by setting the availability of the finance management module(s) 160 linked to the matching reference user profile(s) 195 in the personal finance program 145 to this particular registered user 120, e.g., by automatically activating or deactivating the finance management modules(s) or allowing the registered user 120 to opt to activate or deactivate the finance management modules(s) (step 330).

The product offering module 185 then allows the user 120 access to the customized personal finance program 145 (step 335). The life event monitoring module 175 monitors information that is indicative of life events of the user 120 (step 340), and the registered user module 165 updates the user profile 190 stored in the data store 155 based on the monitored life event information (step 345). The product offering module 185 compares the updated user profile 190 with the reference user profiles 195 (step 310), and again determines a match or matches between the updated user profile 190 and any of the reference user profiles 195 (step 350). The product offering module 185 then offers any previously deactivated finance management modules 160 linked to any matching reference user profiles 195 to the user 120 (step 355).

Figure 8:
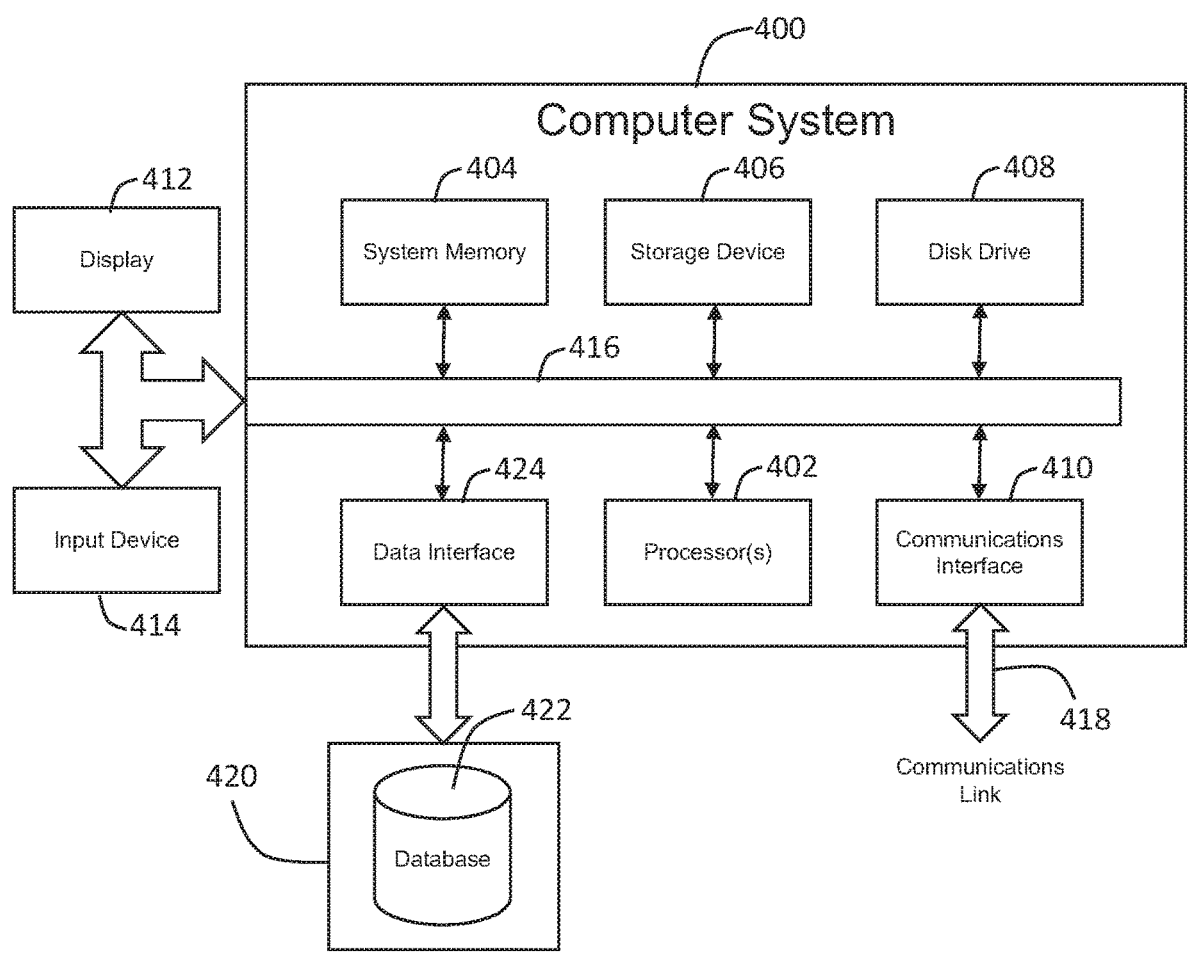
FIG. 8 is a computer system that can be implemented in the product offering system of FIG. 1.

Referring now to FIG. 8, a block diagram of components of an illustrative computing system 400 suitable for implementing an embodiment of the host computer 105 and other computing devices will now be described. The computing system 400 includes one or more processors 402, system memory 404 (e.g., RAM), static storage device 406, disk drive 408 (e.g., magnetic or optical), wireless communication interface 410 (e.g., modem or Ethernet card), display 412 (e.g., LRT or LCD), input device 414 (e.g., keyboard and cursor control device), and a bus 416 or other communication mechanism for interconnecting these components. The processor(s) 402 may execute one or more sequences of one or more instructions contained in system memory 404. Such instructions may be read into system memory 404 from another computer readable/usable storage medium, such as static storage device 406 or disk drive 408.

The computer system 400 may transmit and receive messages, data, and instructions, including program, i.e., application code, through communication link 416 and communication interface 410. Received program code may be executed by processor 402 as it is received, and/or stored in disk drive 408, or other non-volatile storage for later execution. The computer system 400 may in conjunction with a data storage system 418, e.g., a data storage system 418 that contains a database 420 that is readily accessible by the computer system 400. The computer system 400 communicates with the data storage system 418 through a data interface 422. The data interface 422, which is coupled to the bus 416, transmits and receives electrical, electromagnetic or optical signals that include data streams representing various types of signal information, e.g., instructions, messages and data. The functions of the data interface 422 may be performed by the communication interface 410.

In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. The processor(s) 402 may be used to perform various actions such as various actions, processes, or modules involving determining, analyzing, performing actions, etc.

The term "computer readable storage medium" or "computer usable storage medium" as used herein refers to any non-transitory medium that participates in providing instructions to the processor(s) 402 for execution. Such a medium may take many forms, including but not limited to, non-volatile media and volatile media. Non-volatile media includes, for example, optical or magnetic disks, such as the disk drive 408. Volatile media includes dynamic memory, such as the system memory 404.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense. Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. Accordingly, embodiments are intended to exemplify alternatives, modifications, and equivalents that may fall within the scope of the claims.

What is claimed is:

1. A method of customizing a modularized personal software program for a user, comprising:
    collecting attributes of each of a plurality of other users registered to access the personal software program;
    generating a plurality of user profiles based on the collected attributes of the other users;
    monitoring interactions and non-interactions of the other users with a module of the personal software program, said monitoring comprising monitoring a number of times or frequency of the interactions with the module;
    deriving a reference user profile from the plurality of user profiles based on the monitored interactions and non-interactions, the reference user profile comprising one or more of the collected attributes of the other users;
    linking the module with the reference user profile based on the monitored interactions and non-interactions of the other users with the module, wherein linking the module with the reference user profile comprises determining a percentage of the other users that interact with the module, comparing the interaction percentage to a threshold percentage, and linking the module to the reference user profile based on the comparison between the interaction percentage and the threshold percentage;
    acquiring attributes of the user;
    generating a user profile based on the acquired attributes of the user;
    comparing the user profile to the reference user profile;
    determining a match between the user profile and the reference user profile based on the comparison; and
    setting availability of the module to the user.

2. The method of claim 1, wherein setting the availability of the module to the user comprises making the module available to the user.

3. The method of claim 2, wherein making the module available to the user comprises automatically activating the module in a personal software program available to the user.

4. The method of claim 2, wherein making the module available to the user comprises providing the user an option to activate the module in a personal software program available to the user.

5. The method of claim 1, wherein setting the availability of the module to the user comprises making the module unavailable to the user.

6. The method of claim 5, wherein making the module unavailable to the user comprises automatically deactivating the module in a personal software program available to the user.

7. The method of claim 1, further comprising:
    monitoring interactions and non-interactions of the other users with another module of the personal software program;
    deriving another reference user profile from the plurality of user profiles;
    linking the another module with the another reference user profile based on the monitored interactions and non-interactions of the other users with the another module; and
    comparing the user profile to the another reference user profile.

8. The method of claim 7, wherein the module and the another module are different from each other.

9. The method of claim 7, wherein the module and the another module are the same.

10. The method of claim 1, further comprising:
    monitoring interactions and non-interactions of the other users with another module of the personal software program;
    linking the another module with the reference user profile based on the monitored interactions and non-interactions of the other users with the another module; and
    setting the availability of the another module to the user.

11. The method of claim 1, wherein the collected attributes of the other users comprise one or more of an age, gender, occupation, geographical residence, marital status, number of dependents, ethnicity, education level, and income level.

12. The method of claim 1, wherein monitoring the interactions and non-interactions of the other users with the module comprises monitoring a date range of the interactions with the module.

13. The method of claim 12, wherein the date range is from present day to a period of time prior to the present day.

14. The method of claim 1, wherein the module is linked to the reference user profile if the interaction percentage is greater than the threshold percentage.

15. The method of claim 1, wherein the module is linked to the reference user profile if the interaction percentage is less than the threshold percentage.

16. The method of claim 1, wherein linking the module with the reference user profile comprises determining a number of times or frequency that each of the other users interacts with the module, and comparing the number of times or frequency to a threshold number, and linking the module to the reference user profile based on the comparison between the number of times or frequency and the threshold number.

17. The method of claim 1, further comprising:
monitoring life events of the other users; and
updating the user profiles based on the monitored life events.

18. The method of claim 17, wherein the match determination and module availability steps are triggered by a monitored life event of the user.

19. A method of customizing a modularized personal finance program for a user, comprising:
collecting attributes of each of a plurality of other users registered to access the personal finance program;
generating a plurality of user profiles based on the collected attributes of the other users;
monitoring interactions and non-interactions of the other users with a finance management module of the personal finance program, said monitoring comprising monitoring a number of times or frequency of the interactions with the finance management module;
deriving a reference user profile from the plurality of user profiles based on the monitored interactions and non-interactions, the reference user profile comprising one or more of the collected attributes of the user;
linking the finance management module with the reference user profile based on the monitored interactions and non-interactions of the other users with the finance management module, wherein linking the finance management module with the reference user profile comprises determining a percentage of the other users that interact with the finance management module, comparing interaction percentage to a threshold percentage, and linking the finance management module to the reference user profile based on the comparison between the interaction percentage and the threshold percentage;
acquiring attributes of the user;
generating a user profile based on the acquired attributes of the user;
comparing the user profile to the reference user profile;
determining a match between the user profile and the reference user profile based on the comparison; and
setting availability of the finance management module to the user.

20. The method of claim 19, wherein setting the availability of the finance management module to the user comprises making the finance management module available to the user.

21. The method of claim 20, wherein making the finance management module available to the user comprises automatically activating the finance management module in a personal finance program available to the user.

22. The method of claim 20, wherein making the finance management module available to the user comprises providing the user an option to activate the finance management module in a personal finance program available to the user.

23. The method of claim 19, wherein setting the availability of the finance management module to the user comprises making the finance management module unavailable to the user.

24. The method of claim 23, wherein making the finance management module unavailable to the user comprises automatically deactivating the finance management module in a personal finance program available to the user.

25. The method of claim 19, further comprising:
monitoring the interactions and non-interactions of the other users with another finance management module of the personal finance program;
deriving another reference user profile from the plurality of user profiles;
linking the another finance management module with the another reference user profile based on the monitored interactions and non-interactions of the other users with the another finance management module; and
comparing the user profile to the another reference user profile.

26. The method of claim 25, wherein the finance management module and the other finance management module are different from each other.

27. The method of claim 25, wherein the finance management module and the other finance management module are the same.

28. The method of claim 19, further comprising:
monitoring interactions and non-interactions of the other users with another finance management module of the personal finance program;
linking the another finance management module with the reference user profile based in the monitored interactions and non-interactions of the users with the another finance management module; and
setting the availability of the another finance management module to the user.

29. The method of claim 19, wherein the collected attributes of the other users comprise one or more of an age, gender, occupation, geographical residence, marital status, number of dependents, ethnicity, education level, and income level.

30. The method of claim 19, wherein monitoring the interactions and non-interactions of the other users with the finance management module comprises monitoring a date range of the interactions with one or more of the finance management module.

31. The method of claim 30, wherein the date range is from present day to a period of time prior to the present day.

32. The method of claim 19, wherein the finance management module is linked to the reference user profile if the interaction percentage is greater than the threshold percentage.

33. The method of claim 19, wherein the finance management module is linked to the reference user profile if the interaction percentage is less than the threshold percentage.

34. The method of claim 19, wherein linking the finance management module with the reference user profile comprises determining a number of times or frequency that each of the other users interacts with the finance management module, and comparing the number of times or frequency to a threshold number, and linking the finance management module to the reference user profile based on the comparison between the number of times or frequency and the threshold number.

35. The method of claim 19, further comprising:
monitoring life events of the other users; and
updating the user profiles based on the monitored life events.

36. The method of claim 35, wherein the match determination and finance management module availability steps are triggered by a monitored life event of the user.

* * * * *